Reissued Mar. 9, 1943

Re. 22,285

UNITED STATES PATENT OFFICE 22,285

DETONATOR

Sylvester B. Large, Tamaqua, and Guy F. Rolland, McKeansburg, Pa., assignors to Atlas Powder Company, Wilmington, Del., a corporation of Delaware No Drawing. Original No. 2,195,032, dated March 26, 1940, Serial No. 202,437, April 16, 1938. Application for reissue March 29, 1941, Serial No. 385,799½

18 Claims. (Cl. 52—4)

Our invention relates to improvements in detonators, such as are used for initiating charges of explosives. It is applicable to both electric and safety fuse types of both simple and compound detonators.

More specifically, it pertains to improved ignition media for detonators, whose main charge or charges (primary as well as base charges) are of the so-called "safety" types or defined as being free of any explosive ingredient which is as sensitive to friction and impact as any of the group of explosives exemplified by mercury fulminate, lead azide, diazodinitrophenol, and the like. Detonators of this type have previously been proposed, as for example in U. S. Patents 1,928,204 to 1,928,208 to Large, which patents also show that unusual and specific types of ignition media are requisite.

All previously proposed ignition media for these types of detonators have one or more objectionable features, however, over which the products of the present invention have certain advantages.

Whereas pre-formed fuse-heads function quite satisfactorily (see U. S. Patent 1,928,205 to Large), they have the objection of being less simple in construction than ignition media in the form of superimposed layers or wafers of inflammable compositions, functioning to transmit ignition from either safety-fuse or electrically heated bridge-wires to the "safety" type of primary detonator composition. On the other hand, flash compositions, heretofore proposed for use in the latter form of ignition medium, also have one or more objections. Some are insufficiently moisture resistant to be of practical use for open type fuse-caps, some are so hot or violent that they melt or otherwise prematurely injure the confining means of a "safety" type primary detonator charge so as to render it unreliable, some are required in uneconomically large amounts, while some are relatively dangerous to manufacture on account of their high sensitivity to friction. One of the chief difficulties has been to find a flash composition that is relatively safe to manufacture, is sufficiently moisture resistant and otherwise suitable for use in open type fuse-caps, and which, at the same time, can be used in economically small amounts.

An object of the invention is the production of new and improved types of detonators overcoming these difficulties and objections.

Another object of the invention is the production of detonators characterized by excellent and reliable detonating efficiency, by low cost, and by being relatively safe for manufacture and use.

A still further object of the invention is the production of an improved ignition medium for a "safety" type primary detonator composition.

Other objects of the invention will hereinafter more fully appear.

This application is a continuation-in-part of our co-pending application Serial No. 63,396 filed February 11, 1936.

The present invention consists in the employment of inflammable compositions comprising diazodinitrophenol (4-6 dinitro-2 diazophenol) as the ignition or kindling media for the "safety" type of primary detonator composition in a detonator. This invention is based on our discovery that diazodinitrophenol functions, in very small quantities, as ignition media for the inflammation or kindling of "safety" types of primary detonator charges, such as nitromannite, nitrodulcite, nitrolactose and the like; diazodinitrophenol being at the same time appreciably more moisture resistant for use in open-type fuse caps and somewhat safer to manufacture than previously proposed compositions that are usable for this purpose, in such small quantities.

This is in contradistinction to the characteristics of mercury fulminate and certain admixtures thereof, which are unsuitable for this purpose, as pointed out on page 2, lines 76–114 of U. S. Patent 1,928,208 to Large. Although diazodinitrophenol and mercury fulminate are considered equivalent for use in conventional types of detonators comprising them, in that they are similar in respect to their both being capable of quickly advancing from ignition to detonation (particularly when confined), they have been found to differ widely in their actions as ignition media for the inflammation of "safety" types of primary detonator compositions. Whereas we have found diazodinitrophenol to function in very small quantities (as little as .01 gram) to effectively ignite the confined "safety" type of primary charge, as nitromannite and the like, without premature injury to the confining means (as the shell and/or inner capsule surrounding the said primary charge); fulminate of mercury, in similar amounts, merely destroys the confinement without effectively igniting the "safety" type of primary charge.

While we are aware that diazodinitrophenol has been proposed heretofore as a detonating explosive charge in various types as detonators, as for example as the essential ingredient of primary as well as secondary charges in compound detonators, percussion caps, etc., we nevertheless believe ourselves to be the first to propose a detonator comprising a "safety" type of primary detonator charge capable of ignition by a deflagrating, non-detonating medium and of advancing from deflagration to detonation, and for the ignition of said primary charge, an ignition medium comprising diazodinitrophenol, said ignition medium serving to fire the primary charge by initiating deflagration therein as distinguished from initial detonation therein. By firing the primary charge by initiating deflagration therein as distinguished from initial detonation therein is meant the firing of the primary charge by an ignition medium incapable of detonating a non-primary base charge which will not advance from inflammation to detonation such as tetryl, but capable of igniting a confined "safety" type primary charge with sufficient inflammation so that the confined primary charge will advance from ignition to detonation.

A marked distinction must be drawn between the functioning of diazodinitrophenol as an inflammatory ignition medium for kindling the "safety" type of primary detonator charge and its functioning as a primary charge, itself, in compound detonators, as described, for example, in U. S. Patent No. 1,404,687 to Dehn. In the latter case, detonating primary or primer charges of diazodinitrophenol are used to initiate secondary or base charges of explosives, which are usually of the non-primary detonating type, such as tetryl and the like, the secondary or base charge initially detonating under the action of the primary charge. In U. S. Patent No. 1,759,565 Crater discloses nitrolactose as an explosive of this latter, non-primary type for use as a substitute for or in admixture with tetryl and the like wherein fulminate-chlorate, lead azide, diazodinitrophenol, etc., are employed as the primary or "initial primer" detonating substances. But, in contradistinction to non-primary detonating types of explosives, nitromannite, nitrodulcite, nitrolactose and the like are now known to function as primary detonator charges when merely ignited by means of suitable deflagrating flash compositions, as described in U. S. Patents 1,928,204 to 1,928,208 to Large.

The following will serve to illustrate the wide difference existing between the functioning of diazodinitrophenol as the detonating primary charge in a conventional compound detonator, and its functioning as an ignition medium for the relatively new "safety" type primary charges in accordance with the present invention. Whereas, for example, a conventional type of compound detonator, containing a base charge of tetryl in a .222'' inside diameter shell requires a primary charge of diazodinitrophenol consisting of at least about .20 gram pressed at 75 lbs. total pressure beneath a perforated inner capsule to obtain detonating initiation of the tetryl, a detonator, in accordance with the present invention, and containing the same tetryl base charge in the same size shell but containing a .20 gram primary charge of nitromannite pressed at 75 lbs. total pressure beneath the same size inner capsule, requires only as little as .02 gram flash charge of diazodinitrophenol to effectively ignite the primary charge which advances from ignition to detonation.

From the foregoing it will be evident that the amounts of diazodinitrophenol (or compositions comprising diazodinitrophenol) employed as flash charges in detonators of the present invention are substantially less than those required for use as primary detonating compositions in detonators, in accordance with previous proposals, as for example, those described in U. S. Patent 1,404,687 to Dehn and U. S. Patent 1,759,565 to Crater.

Non-limiting examples of detonators that function in a reliable and practical manner with diazodinitrophenol as the superimposed flash or ignition charge, in accordance with the present invention, are:

*Example 1*

A fuse cap comprising a .222'' inside diameter shell, a base charge of .2 gram of tetryl pressed therein at about 150 lbs. total pressure, a primary charge of .2 gram of nitromannite and superimposed thereon a flash charge of .01 gram diazodinitrophenol; the said primary and flash charges being pressed in one operation at 10 lbs. total pressure (273 lbs./sq. in.).

*Example 2*

A fuse cap similar to Example 1, but with the said flash charge consisting of .08 gram diazodinitrophenol and with the said primary and flash charges pressed in one operation at 25 lbs. total pressure (682 lbs./sq. in.).

*Example 3*

A fuse cap similar to Example 1, but with the said flash charge consisting of .02 gram diazodinitrophenol and with the said primary and flash charges pressed under a perforated inner capsule at 75 lbs. total pressure (2047 lbs./sq. in.).

*Example 4*

A fuse cap comprising a .222'' inside diameter shell, a base charge of .2 gram of tetryl pressed therein at about 150 lbs. total pressure, a primary charge of .2 gram of nitromannite pressed under a perforated inner capsule at 75 lbs. total pressure, and a flash charge of .05 gram of diazodinitrophenol superimposed upon the said primary charge and inner capsule and seated at a total pressure of 75 lbs. (2047 lbs./sq. in.).

*Example 5*

An electric detonator comprising a .260'' inside diameter shell, a base charge of .2 gram of tetryl pressed therein at about 175 lbs. total pressure, a primary charge of .2 gram of nitromannite pressed under a perforated inner capsule at 90 lbs. total pressure, and a loose flash charge of .08 gram diazodinitrophenol superimposed upon the said primary charge and inner capsule and surrounding an electric bridge-wire.

*Example 6*

A fuse cap comprising a .222'' inside diameter shell, containing .35 gram nitromannite pressed therein under a perforated inner capsule at 100 lbs. total pressure and a flash charge consisting of .05 gram of diazodinitrophenol pressed above the inner capsule at 75 lbs. total pressure. (2047 lbs./sq. in.)

Although amounts of inflammable compositions comprising diazodinitrophenol ranging from .01 to .15 gram have been found to function satisfactorily as ignition media in detonators having inside diameters of .222'', it will be understood that the amount selected for use will vary over a considerable range; depending on the type and diameter of detonator involved. Height of charge of the ignition medium is an important criterion in selecting the amount to be used. For example, in a fuse cap having an inside diameter of about .222'', it is desirable to employ at least .05 gram of diazodinitrophenol, having a charge height of about .05 inch after being pressed at 75 lbs. total pressure, in order to provide enough of the material to form a pressed charge that will resist rumbling out. By "rumbling out" is meant the breaking away or loss of a portion of the charge due to the detonator being jarred or subjected to vibration during manufacture, handling, shipping, etc. Also, for electric detonators, it is desirable to employ sufficient material to adequately cover the bridge-wire used, which should range from about .12 to about .20 inch. For example, an electric detonator, having an inside diameter of about .260", would require from about .08 to about .13 gram charge of loose diazodinitrophenol. Depending upon the type of detonator and type of flash charge, the height of flash charge may vary from .02 to .25 inch. In order to maintain these heights within detonator shells having larger diameters than those recited above, it will be evident that greater weights of charge will be required, without departing from the invention.

The present invention contemplates the use of diazodinitrophenol, in the manner described, either alone or admixed with other ingredients, such as for example; nitrolactose, nitroinositol, nitrodulcite, nitrostarch, nitromannite, oxygen-delivering compounds, such as potassium chlorate, potassium perchlorate, ammonium perchlorate, barium nitrate, barium peroxide, lead oxides, and the like, etc. Examples of mixtures found to function quite satisfactorily are as follows: potassium chlorate, ammonium perchlorate, or nitromannite mixed in proportions up to 50% with diazodinitrophenol. Barium nitrate has also proved satisfactory in amounts up to 25% when mixed with diazodinitrophenol. As little as .05 gram of each of the above mixtures will effectively ignite caps each having .20 gram tetryl base charge and .20 gram of nitromannite primary charge, confined under an inner capsule; the flash compositions being pressed above the capsule, in each case, at pressures ranging up to 150 lbs. dead weight in .222" inside diameter shells (4100 lbs./sq. in.). Flash compositions comprising diazodinitrophenol and other admixed ingredients may be prepared in various suitable ways, as for example: dry mixing, wet mixing, co-precipitation from a mutual solvent, etc.

From the foregoing examples, it can be seen that where the ignition medium embodying the present invention is in the form of a compressed flash charge, usually preferred for open fuse caps, the pressure employed in pressing the ignition medium may vary over wide limits, particularly where the diazodinitrophenol is admixed with other ingredients. However, these compressed flash charges most effectively ignite "safety" type primary detonator composition when relatively low pressure is employed in pressing the flash charge, and generally, the pressure employed in pressing the flash charge is lowered as the diazodinitrophenol content is reduced and as the proportion of admixed ingredients (other than diazodinitrophenol) is raised. Preferably, compressed flash charges embodying the present invention are lightly compressed, i. e., formed under pressure below 50 lbs. total in a .222" diameter shell or below 1365 lbs./sq. in. Flash compositions comprising diazodinitrophenol admixed with a combustible, organic nitrate binding ingredient which becomes coherent when subjected to pressure, such as nitrolactose, nitroinositol, nitrodulcite, nitrostarch or nitromannite, have been found to be highly desirable for the formation of compressed flash charges, such compositions being highly resistant to rumbling out during manufacturing, handling, etc., even though pressed at pressures below 600 lbs./sq. in. The following examples are exemplary of this embodiment of the invention:

*Example 7*

A fuse cap comprising a .222" inside diameter shell, a base charge of .23 gram of tetryl, pressed therein at about 150 lbs. total pressure, a primary charge of .17 gram of nitromannite and superimposed thereon, a flash charge of .06 gram of a flash composition consisting of 25% nitrodulcite and 75% diazodinitrophenol; the said primary and flash charges being pressed in one operation at 30 lbs. total pressure (819 lbs./sq. in.).

*Example 8*

A fuse cap similar to Example 7 but with a flash charge of .06 gram of a flash composition consisting of 25% nitrostarch and 75% diazodinitrophenol.

*Example 9*

A fuse cap similar to Example 7 but with a flash charge of .06 gram of a flash composition consisting of 25% nitromannite mixed with 75% diazodinitrophenol.

*Example 10*

A fuse cap similar to Example 7 but with a flash charge of .06 gram of a flash composition consisting of 25% nitroinositol mixed with 75% diazodinitrophenol.

*Example 11*

A fuse cap similar to Example 7 but with a flash charge of .06 gram of a flash composition consisting of 25% nitrolactose mixed with 75% diazodinitrophenol and with the said primary and flash charges pressed in one operation at 20 lbs. total pressure (546 lbs./sq. in.).

We have found that the amount of diazodinitrophenol in certain open type fuse caps embodying the present invention may be selected so as to give a high degree of protection against the firing of the "safety" type primary charge by the ignition of the flash charge by accidental direction of the spit of a fuse into the open end of a cap, even though the said flash charge will consistently and effectively fire the primary detonator composition from the spit of a fuse which has been inserted into the open end of the fuse cap. Thus, for example, in detonators having .24 gram of tetryl pressed at about 150 lbs. as a base charge, and .17 gram of nitromannite as a primary charge, and a flash charge consisting of diazodinitrophenol in an amount not greater than about .05 gram, the said primary and flash charges being pressed in one operation at about 20 lbs. total pressure (546 lbs. per sq. in.), the primary charge consistently failed to detonate when the flash charge was ignited by the spit of a "clover" fuse directed into the open end of the cap from a distance of at least ⅛ in. outside the open end of the cap. On the other hand, such detonators consistently fired from the spit of the "clover" fuse when the fuse was inserted into the open end of the cap, even though the cap was not crimped upon the fuse. Similarly, in detonators having a base charge of .24 gram tetryl pressed at about 150 lbs., a primary charge of .17 gram nitromannite and a flash charge of not more than about .08 gram of an inflammable composition consisting of 75% diazodinitrophenol and 25% nitromannite, the primary charge and flash charge being pressed in one operation at 20 lbs. total pressure (546 lbs. per sq. in.), the primary charge consistently failed to detonate when the flash charge was ignited by the spit of a "clover" fuse directed into the open end of a cap from a distance of ⅛ in. or more, but consistently fired when the fuse was inserted into the end of the cap, even though the cap was not crimped about the fuse. With flash charges consisting of a 75%–25% mixture of diazodinitrophenol and nitrolactose or nitrostarch, the fuse caps will pass this test even though larger amounts (up to about .15 gram) of similarly pressed flash composition are employed. In this respect, the critical amounts of flash compositions consisting of diazodinitrophenol and nitrodulcite are somewhat lower, however, and where, for example a 75%–25% mixture of these ingredients pressed at about 546 lbs./sq. in. is employed as a flash charge for a primary detonator charge of nitromannite, the amount of flash composition should not exceed about .06 gram if the fuse cap is to pass this test.

From the above non-limiting examples, it will be evident that we have a wide range of substances from which to choose, for use as admixed ingredients with the diazodinitrophenol in our novel types of detonators; we being limited only with respect to the properties desired in the particular styles of detonators involved. For example, for use in open-type fuse caps, we may prefer to use diazodinitrophenol alone or mixed with other non-hygroscopic ingredients, whereas for use in closed-type electric detonators, we may choose less moisture resistant mixtures, etc. Extensive tests have shown definite advantages for diazodinitrophenol as to moisture resistance, as compared with other materials heretofore proposed for suitable use as ignition media for "safety" types of primary detonator compositions in the form of superimposed layers or wafers.

Electrically fired detonators embodying the present invention have been found to be highly advantageous in that they have more uniform firing time than has been heretofore obtained with commercial detonators having a "safety" type primary charge. Thus, with the commercially available detonators having an electrically fired, pre-formed fuse head which imparts ignition directly to the "safety" type primary detonator composition, the time interval between the first and last to fire of ten detonators in series averages about .0011 second, when fired with an "Atlas 3–50" blasting machine through a total of 50 ohms resistance, whereas with electric preformed fuse head ignition of a flash charge comprising diazodinitrophenol, which in turn inflames the "safety" type primary detonator composition, we have been able to reduce this time interval to less than .0002 second. For example, electric detonators having a base charge of .23 gram tetryl, a primary charge of .12 gram nitromannite, a flash charge of .06 gram of a composition consisting of 75% diazodinitrophenol and 25% nitromannite, the primary charge and the flash charge being confined under a capsule, and an electrically fired, pre-formed match head for ignition of the flash charge, gave an average time interval of about .00007 second between the first and last to fire of ten detonators connected in series.

Where referred to in this specification and appended claims, the term "primary detonator composition" (or "charge") means the material used as the main charge in so-called "simple" or single charge detonators; or that used as the primary or top explosive charge in so-called "compound" detonators, in which are employed explosive base charges, usually of the non-primary detonating type.

By the term "ignition medium," we mean the charge of inflammable material used above the "primary detonator charge" which functions to receive ignition by such means as the end-spit of a safety-fuse, the spit of a delay element in a delay type detonator, the heat of an electrically heated bridge wire embedded therein, the flash of a pre-formed fuse-head, the heat of an electric spark across electric terminals adjacent to or embedded therein, etc. and to subsequently ignite the said "primary detonator charge." It may be in a loose form, as preferred for example for surrounding electric bridge wires in electric detonators; it may be in a compressed form, as preferred for open fuse caps; it may be charged in a wet paste form and subsequently dried; etc.

Examples of "safety" types of primary detonator charges, as defined above, which are contemplated for use in carrying out our invention, are as follows: (1) solid nitration products of polyhydric alcohols of the general formula $C_nH_{n+2}(OH)_n$ (as nitrodulcite, nitromannite, etc.) alone or admixed with various proportions of other solid explosives, materially less sensitive than fulminate of mercury, lead azide, diazodintrophenol and the like (examples of such other solid explosives being tetryl, nitrolactose, nitropentaerythrite, etc.); primary detonator compositions of this type having been disclosed in U. S. Patents Nos. 1,928,204, 1,928,205 and 1,928,206 to Large; (2) solid disaccharide nitric esters (as nitrolactose), alone or admixed with various proportions of other solid explosives, materially less sensitive than fulminate of mercury, lead azide, diazodinitrophenol and the like, as disclosed in U. S. Patent No. 1,928,207 to Large; etc.

It should be clearly understood that a perforated inner capsule, for the confinement of the "safety" type of primary charge, may be used or not, in carrying out the present invention. Although the use of an inner capsule has certain advantages, as for example: (1) the binding action between the capsule and shell tends to hold the charge in place in a more positive manner,—particularly when very low seating pressures are used and (2) it provides added confinement for the primary charge; nevertheless we may eliminate the inner capsule for the sake of economy, without departing from the invention.

We have also discovered that the diazodinitrophenol type of ignition medium, superimposed upon the "safety" type of primary detonator charge, will function beneath as well as on top of an inner capsule when and if used to confine the said primary charge. It will therefore be understood that the invention is broad in this respect, as long as the ignition medium is positioned between the primary detonator charge and the source of heat (safety fuse end-spit, fuse-head, etc.). It has been found preferable, however, to position the ignition medium outside or on top of the confining inner capsule, when and if the latter is used—particularly for fuse caps—in order to present a larger surface area of ignition medium to receive the end-spit from the safety fuse when inserted and crimped therein. One advantage of placing the ignition medium under the inner capsule, however, is that the capsule helps to keep the flash composition in place during handling, shipment, etc., particularly when low seating pressures and/or very thin layers of the flash composition are employed.

From the foregoing, it will be evident that the present invention is applicable to all types and sizes of detonators wherein "safety" types of primary detonator compositions, as defined above, are employed.

The amount of "safety" type of primary detonator composition employed is also incidental and non-limited with respect to the present invention, and with so-called "simple" or single charge detonators is merely dependent upon the type and strength of detonator desired, and with compound detonators is merely dependent upon the minimum amount required to detonate practically and consistently the explosive base charges employed. For example, so-called "simple" or single charge detonators (i. e., without a secondary or base charge), having a strength range that is comparable with that of certain conventional types in common use, may comprise a "safety" primary charge consisting of .10 to .85 gr. nitromannite and an ignition medium consisting of .01 to .15 gram of an inflammable composition comprising diazodinitrophenol. Greater or less than the above amounts of nitromannite may be used, however, without departing from the invention.

Similarly, in the case of compound type detonators, the invention is unrestricted as to the number, kind or amount of explosive base charges employed. For example, tetryl in amounts of from .15 to 1.25 grams has been found to be suitable as a base charge.

What we claim is:

1. In a detonator, the combination of a primary charge consisting of "safety" type primary detonator composition, and for the ignition of the said primary charge, an ignition medium comprising not more than .15 gram diazodinitrophenol, said ignition medium serving to inflame the said primary charge so that it will advance to detonation, and said ignition medium being incapable of directly detonating a non-primary detonator charge of tetryl.

2. In a detonator, the combination of a primary charge consisting of a "safety" type primary detonator composition, and an ignition charge comprising diazodinitrophenol positioned to become ignited from a source of heat and to transfer ignition to the said primary charge, said ignition charge being in the form of a layer having a thickness of from .02 to .25 inch, said ignition medium serving to inflame the said primary charge so that it will advance to detonation, and said ignition medium being incapable of directly detonating a non-primary detonator charge of tetryl.

3. A detonator including a primary charge consisting of a "safety" type primary detonator composition, and an ignition medium for the said primary charge consisting of from .01 to .15 gram of an inflammable material comprising at least .01 gram and at least 50% by weight of diazodinitrophenol, said ignition medium serving to inflame the said primary charge so that it will advance to detonation, and said ignition medium being incapable of directly detonating a non-primary detonator charge of tetryl.

4. A detonator including a primary charge consisting of a "safety" type primary detonator composition comprising a solid nitration product of a polyhydric alcohol of the general formula $C_nH_{n+2}(OH)_n$, and an ignition medium for the said primary charge consisting of from .01 to .15 gram of an inflammable material comprising at least .01 gram and at least 50% by weight of diazodinitrophenol, said ignition medium serving to inflame the said primary charge so that it will advance to detonation, and said ignition medium being incapable of directly detonating a non-primary detonator charge of tetryl.

5. In an open ended fuse cap, the combination of a primary charge consisting of "safety" type primary detonator composition and for the ignition of said primary charge, a lightly compressed ignition charge consisting of .02 to .15 gram of an inflammable material comprising a combustible binding material which becomes coherent when subjected to pressure and at least 50% by weight of diazodinitrophenol, said binding material being present in sufficient amount to prevent rumbling out of the lightly compressed ignition charge, said ignition charge, when ignited by the spit of a fuse inserted into the open end of the cap, serving to fire the primary charge so that the primary charge will advance to detonation, and said ignition charge being present in an amount and under confinement insufficient to fire the primary charge so that the primary charge will detonate when the ignition charge is ignited by the spit of a fuse directed into the open end of the cap from a distance of at least ⅛" outside the open end of the cap.

6. In an open ended fuse cap, the combination of a primary charge consisting of "safety" type primary detonator composition and for the ignition of said primary charge, an ignition charge consisting of from .01 to .15 gram of an inflammable material comprising at least .01 gram and at least 50% by weight of diazodinitrophenol, said ignition charge, when ignited by the spit of a fuse inserted into the open end of the cap, serving to fire the primary charge so that the primary charge will advance to detonation, and said ignition charge being present in an amount and under confinement insufficient to fire the primary charge so that it will detonate when the ignition charge is ignited by the spit of a fuse directed into the open end of the cap from a distance of at least ⅛ inch outside the open end of the cap.

7. In an open ended fuse cap, the combination of a primary charge consisting of nitromannite and for the ignition of said primary charge, an ignition charge consisting of from .01 to .15 gram of an inflammable material comprising at least .01 gram and at least 50% by weight of diazodinitrophenol, said ignition charge, when ignited by the spit of a fuse inserted into the open end of the cap, serving to fire the primary charge so that the primary charge will advance to detonation, and said ignition charge being present in an amount and under confinement insufficient to fire the primary charge so that it will detonate when the ignition charge is ignited by the spit of a fuse directed into the open end of the cap from a distance of at least ⅛ inch outside the open end of the cap.

8. In an open ended fuse cap, the combination of a primary charge consisting essentially of nitromannite, and for the ignition of said primary charge, a flash charge consisting of from .02 to .10 gram of an inflammable composition comprising nitromannite and at least 50% by weight of diazodinitrophenol, said flash charge serving to fire the primary charge so that the primary charge will advance to detonation when the flash charge is ignited by the spit of a fuse inserted into the open end of the cap, and said flash charge being present in an amount and under confinement insufficient to fire the primary charge so that it will detonate when the flash charge is ignited by the spit of a fuse directed into the open end of the cap from a distance of at least ⅛ inch outside the open end of the cap.

9. In an open ended fuse cap, the combination of a primary charge consisting essentially of nitromannite, and for the ignition of said primary charge, a flash charge consisting of from .02 to .15 gram of an inflammable composition comprising nitrolactose and at least 50% by weight of diazodinitrophenol, said flash charge serving to fire the primary charge so that the primary charge will advance to detonation when the flash charge is ignited by the spit of a fuse inserted into the open end of the cap, and said flash charge being present in an amount and under confinement insufficient to fire the primary charge so that it will detonate when the flash charge is ignited by the spit of a fuse directed into the open end of the cap from a distance of at least ⅛ inch outside the open end of the cap.

10. A compound detonator comprising a base charge consisting of .15 to 1.25 grams tetryl, a primary detonator charge consisting of .10 to .25 gram of "safety" type detonator composition, and superimposed thereon an ignition medium consisting of from .02 to .10 gram of an inflammable material comprising at least one compound taken from the group consisting of: nitrolactose, nitroinositol, nitrodulcite, nitrostarch and nitromannite and at least 50% by weight of diazodinitrophenol, said ignition medium serving to inflame the said primary charge so that it will advance to detonation, and said ignition medium being incapable of directly detonating a non-primary detonator charge of tetryl.

11. A compound detonator as set forth in claim 10 and wherein the primary detonator charge consists essentially of nitromannite and the flash charge consists essentially of nitromannite and diazodinitrophenol.

12. A detonator comprising a primary explosive charge consisting of .10 to .85 gram of "safety" type primary detonator composition and superimposed thereon an ignition medium for the said primary detonator charge consisting of .02 to .10 gram of an inflammable material comprising at least one compound taken from the group consisting of: nitrolactose, nitroinositol, nitrodulcite, nitrostarch and nitromannite and at least 50% by weight of diazodinitrophenol, said ignition medium serving to inflame the said primary charge so that it will advance to detonation, and said ignition medium being incapable of directly detonating a non-primary detonator charge of tetryl.

13. A detonator as set forth in claim 12 and wherein the primary detonator charge consists essentially of nitromannite and the flash charge consists essentially of nitromannite and diazodinitrophenol.

14. A detonator comprising a shell, a primary detonator charge consisting of "safety" type primary detonator composition so compressed and confined in the shell that it is capable of advancing from ignition to detonation when ignited by a suitable non-detonating flash composition, and for the ignition of said primary charge an ignition medium comprising not more than .15 gram diazodinitrophenol, said ignition medium being incapable of directly detonating a non-primary detonator charge of tetryl.

15. A detonator comprising a shell, a main charge in the shell free of all explosives as sensitive to friction and impact as mercury fulminate, lead azide, diazodinitrophenol and the like, said main charge having at least a portion thereof consisting of a "safety" type primary detonator composition so compressed and confined in the shell that it is capable of advancing from ignition to detonation when ignited by a suitable non-detonating flash composition, and for the ignition of said primary detonator composition an ignition medium positioned to become ignited by a source of heat and to transfer ignition to the said primary detonator composition, said ignition medium consisting of from .01 to .12 gram of an inflammable material comprising at least .01 gram and at least 50% by weight of diazodinitrophenol.

16. In a detonator, an ignition charge consisting of at least .02 gram of a lightly compressed inflammable admixture comprising combustible, organic nitrate, binding ingredient which becomes coherent when subjected to pressure and at least 50% by weight of diazodinitrophenol, said binding ingredient being present in sufficient proportion to prevent rumbling out of the lightly compressed ignition charge and said ignition charge being present in a lesser amount than that capable of directly detonating a non-primary detonator charge of tetryl.

17. In an open ended fuse cap, an ignition charge consisting of at least .02 gram of a lightly compressed inflammable mixture comprising combustible binding material which becomes coherent when subjected to pressure and at least 50% by weight of diazodinitrophenol, said binding material being present in sufficient proportion to prevent rumbling out of the lightly compressed ignition charge, said ignition charge being present in such amount that when it is ignited by the spit of a fuse inserted into the open end of the cap, it is incapable of directly detonating a non-primary detonator charge of tetryl but capable of directly firing a "safety" type primary detonator charge immediately beneath it so that it will detonate and said ignition charge being present in an amount and under confinement insufficient to fire a "safety" type primary detonator charge so that it will detonate when the ignition charge is ignited by the spit of a fuse directed into the open end of the cap from a distance of at least ⅛'' outside the open end of the cap.

18. In an open-ended fuse cap having an explosive charge; an ignition charge superimposed upon and adapted to fire the explosive charge, said ignition charge consisting of .02 to .15 gram of a lightly compressed inflammable admixture comprising combustible binding material which becomes coherent when subjected to pressure and at least 50% by weight of diazodinitrophenol, said binding material being present in sufficient amount to prevent rumbling out of the lightly compressed ignition charge, said ignition charge when ignited by the spit of a fuse inserted into the open end of the cap being incapable of directly detonating a non-primary detonator charge of tetryl but being capable of directly firing a "safety" type primary detonator charge so that it will detonate, and said ignition charge being present in an amount and under confinement insufficient to fire a "safety" type primary detonator charge so that it will detonate when the ignition charge is ignited by the spit of a fuse directed into the open end of the cap from a distance of at least ⅛'' outside the open end of the cap.

SYLVESTER B. LARGE.
GUY F. ROLLAND.